United States Patent
Parjus et al.

(10) Patent No.: US 7,967,985 B1
(45) Date of Patent: *Jun. 28, 2011

(54) GREASE TRAP WASTE TREATMENT AND FAT, OIL, AND GREASE (FOG) RECOVERY SYSTEM

(76) Inventors: Jose Alejandro Parjus, Weston, FL (US); Rodolfo Larosa, Cardano al Campo (IT); Antonio Gonzalez, Lakeland, FL (US)

( * ) Notice: Subject to any disclaimer, the term of this patent is extended or adjusted under 35 U.S.C. 154(b) by 243 days.

This patent is subject to a terminal disclaimer.

(21) Appl. No.: 11/903,928

(22) Filed: Sep. 25, 2007

Related U.S. Application Data

(63) Continuation of application No. 11/515,492, filed on Sep. 1, 2006, now Pat. No. 7,338,602.

(51) Int. Cl.
  *B01D 11/00* (2006.01)
  *C02F 1/40* (2006.01)
(52) U.S. Cl. ........ 210/634; 210/768; 210/772; 210/776; 210/804; 210/805
(58) Field of Classification Search ................... 210/259, 210/634, 639, 768, 770, 772, 776, 804–806; 554/205
See application file for complete search history.

(56) References Cited

U.S. PATENT DOCUMENTS

| | | | | |
|---|---|---|---|---|
| 3,218,253 A | * | 11/1965 | Clarke et al. | 210/669 |
| 5,458,780 A | * | 10/1995 | Evans | 210/634 |
| 5,543,050 A | * | 8/1996 | Roshanravan | 210/605 |
| 5,601,715 A | * | 2/1997 | Middleton et al. | 210/469 |
| 7,070,693 B2 | * | 7/2006 | Kelly | 210/609 |
| 7,161,017 B2 | * | 1/2007 | Garro et al. | 554/205 |
| 7,338,602 B1 | * | 3/2008 | Parjus et al. | 210/634 |
| 2005/0085653 A1 | * | 4/2005 | Garro et al. | 554/175 |

* cited by examiner

*Primary Examiner* — Joseph W Drodge
(74) *Attorney, Agent, or Firm* — Mark Levy; Hinman, Howard & Kattell

(57) ABSTRACT

A method to process grease trap waste or refuse and remove organic matter, and reclaim fats, oils, and grease (FOG) found in it. The process is initiated after dewatering the grease trap material to increase its concentration; the resulting sludge is then mixed with a solvent. The dissolved fractions of fats, oils, and grease are separated using mechanical methods. The solids are washed to further remove any traces of fats, oils, and grease. The solids, substantially free from organic content, are dried to remove any water and/or organic matter remaining, rendering inert solids that can be safely disposed of according to Environmental Protection Agency (EPA) regulations. All fats, oils, and, grease fractions are separated, containing no inert materials, and no water. The solvent is recuperated (recycled), allowing it to be used over again. The recuperated grease fractions, highly pure and homogeneous, constitute an excellent raw material for further oleo-chemical processes and applications.

11 Claims, 1 Drawing Sheet

GREASE TRAP WASTE TREATMENT AND FAT, OIL, AND GREASE (FOG) RECOVERY SYSTEM

RELATED APPLICATIONS

This application is a Continuation application of patent application Ser. No. 11/515,492 filed Sep. 1, 2006 and now issued as U.S. Pat. No. 7,338,602, which is hereby incorporated by reference.

FIELD OF THE INVENTION

The present invention relates to the treatment of grease trap waste or refuse and, more particularly, to the physical and chemical treatment of dewatered grease trap waste to remove all organic matter, reclaiming fats, oils, and grease (FOG) found in it.

BACKGROUND OF THE INVENTION

Fats, oils, and grease (FOG) are present in meat fat, food scrap, cooking oil, shortening, lard, gravy, butter and margarine, and food products such as mayonnaise, salad dressings, and sour cream.

FOG poured down kitchen drains (commercial and residential) accumulates inside sewer pipes. As FOG builds up, it restricts the flow in the pipe and can cause untreated wastewater to back up into homes and businesses, resulting in high costs for cleanup and restoration. FOG discharged into septic systems and drain fields can cause malfunctions, resulting in more frequent tank pump-outs and other expenses.

Restaurants, cafeterias, and fast-food establishments can spend tens of thousands of dollars on plumbing emergencies each year to deal with grease blockages and pump out grease traps and interceptors. Some cities also charge businesses for the repair of sewer pipes and spill cleanup if they can attribute the blockage to a particular business. Some cities also add a surcharge to wastewater bills if a business exceeds a specified discharge limit. These expenses can be significant.

Communities spend billions of dollars every year unplugging or replacing grease-blocked pipes, repairing pump stations, and cleaning up costly and illegal wastewater spills. Manholes can overflow into parks, yards, streets, and storm drains, allowing FOG to contaminate local waters, including drinking water. Exposure to untreated wastewater is a public-health hazard.

Communities, counties, and water districts are grappling with the issue of how best to handle grease trap wastes. Most wastewater treatment plant managers feel that from a technical point of view, it is best to have regulations requiring restaurants to have grease traps pumped regularly, and to have the waste discharged at wastewater treatment plants where it can be properly treated and disposed of. However, local realities often create far less effective solutions to this problem. In some areas, there are no legal or permitted approaches to disposing of grease trap waste, forcing it to be done illegally. Data collection in such areas is essentially impossible. Many cities and municipalities lack an adequate grease management program, and few have implemented basic operations to adequately handle grease trap waste. Under these circumstances, reaching satisfactory and conclusive goals becomes difficult at best. Many cannot keep up with the growing inflows of grease trap refuse generated by their expanding communities and lack adequate budgets for necessary expansion.

Meanwhile, the Environmental Protection Agency (EPA) continues to tighten its requirements for disposal of grease trap refuse, exacerbating resources to meet existing regulations for disposal of these materials. The problem is so severe in some areas that many cities do not enforce grease trap waste collection for lack of alternatives to process this waste in accordance with EPA requirements. The problem intensifies as the EPA imposes further restrictions on existing sites, and potential alternative locations continue to compete with new urban developments. Lack of effective treatment of grease trap waste results in higher costs for treatment of wastewater for municipalities and higher costs to the customers for servicing grease traps.

Cities, municipalities, and water districts handle grease trap waste in different ways. In some areas, where land is available, grease trap waste is delivered to a soil regeneration operation where oily waste and greases are bioremediated using microbes and nutrients. Materials are blended and composted, and the product is used as topsoil for the final cover on closed landfill sites. Other municipalities rely on septic tank service companies or grease trap services to treat their own grease trap waste collections. Waste sludge (FOG and other materials) is separated or decanted from water; the pH of the sludge is adjusted with lime; and then the material is land spread, in accordance with permits from county and state environmental agencies. Most of these companies essentially do a material pick-up and land filling of solids after water is removed.

In some cities, pump trucks drive to designated sites and discharge grease trap waste to manholes that provide a direct path to the wastewater treatment plant. In effect, restaurant grease is prevented from flowing through the narrow drains and piping at the beginning of the collection system, but is re-injected into the main sewage stream near the treatment plant where the lines are wide and plugging is not a concern. More commonly, trucks are required to discharge grease trap wastes at the wastewater treatment plant where accurate records can be kept and sources can be monitored.

Other solutions also exist. Among them are grease trap pumping companies that dewater the waste and haul the grease cake to refuse incinerators. Others use a bioremediation process (bacteria) to convert grease to inert solids. Gray water enters the treatment plant and solids are conveyed to the landfill.

Biological remediation for grease trap waste treatment also includes aerobic and anaerobic treatments. The aerobic treatments are represented by the use of lagoon systems, biofiltration, and activated sludge processes. The anaerobic processes are based on different bacterial treatments to decompose organic solids and liquid waste, and other materials, into soil augmentation substances, biological fertilizer, or biogas.

U.S. Pat. No. 5,458,780 for Method of Treating Waste Water, issued to Evans, discloses a waste stream mixed with a solvent that absorbs the oily material without dissolving in the water phase. The remaining water/solids mixture is then separated by vibratory screening, and the solids are again contacted with solvent to remove the bulk of the remaining oily material. The remaining mostly solid material is screened again and then dried to remove any remaining solvent. The solvent is processed to remove the dissolved oily material, which is then sold or discarded. The water from the screening and drying steps is processed to remove any solvent entrained with the water, and the resulting solvent, solids and oil-free water is discharged.

U.S. Pat. No. 5,543,050, for Grease Trap Wastewater Treatment Process, issued to Roshanravan and assigned to Mel Darling-Delaware Company, Inc., discloses a system that uses both aerobic and anaerobic treatment processes on grease-trap waste contents. The system initially screens the wastewater to remove larger solid-waste matter particles. The wastewater is next anaerobically and aerobically processed. The anaerobic and aerobic processes use dissolved air flotation clarifiers utilizing gas entrained water to remove solid-waste matter from the wastewater. The anaerobic and aerobic processes also use digester apparatus which break down the solid-waste matter of the wastewater. The anaerobic digester uses anaerobic biological processes for breaking down the solid-waste matter while the aerobic digester uses aerobic biological processes. The two by-products of this system, the clarified wastewater and the composted solid-waste matter, are both more ecologically acceptable alternatives than dumping the grease trap contents into a landfill site.

U.S. Pat. No. 6,015,496, for In-Sewer Treatment of Wastewater and Sludges, issued to Boris M. Khudenko, describes a method and apparatus for in-sewer wastewater treatment comprising steps of largely spontaneously growing acidogenic bacteria in sewer lines and providing methanogenic bacteria in those lines. Methanogenic bacteria can be grown using wastewater, solid, or other waste, or other organic feedstock as a substrate. Methanogenic bacteria can be cultivated at a wastewater treatment plant or at other locations in special reactors, or provided from anaerobic wastewater pretreatment plants. Digestion gases can be either vented out or collected and used.

U.S. Pat. No. 7,070,693, for a Process for Treating Septage, issued to Robert J. Kelly, discloses a process and apparatus for the treatment septage, or grease trap waste. The process converts the septage into biosolids (sludge) and water dischargeable into the environment. The treated septage achieves pathogen reduction and reduced vector attraction. Treatment of septage by pasteurization causes the destruction of harmful pathogens. Pasteurization of septage having high water content provides for even temperature elevation and distribution of heat within the thermal mass of the septage allowing for consistent pathogen destruction. An alkaline compound is utilized to form a filter cake from the solids fraction of the pasteurized septage preventing vector attraction, while producing a beneficial biosolid. The liquid fraction of the septage is treated by biological process allowing for its discharge into the environment.

Some grease trap pumping services process their collections and separate some of the grease found in the refuse by "skimming" the grease that surfaces in the water, pumped along when servicing the grease traps, after it settles in holding tanks or dewatering facilities. The reclaimed grease may be put to many alternative uses, such as animal feeds, etc.

For example, U.S. Pat. No. 5,601,715, for Multi-Stage Grease Trap Filter and Skimmer, assigned to New Pig Corporation by Dennis G. Middleton and Robert J. Starr, discloses an apparatus for removing grease from a compartmental grease trap that has water provided therewithin so that grease forms a layer atop the water in the trap. A filter media then skims off the layer of grease (claim 17).

United States Patent Application No. 20050085653, by Juan Miguel Garro, et al., for a Method for Fabricating Grease Trap Waste and Uses of Dractions Therefrom, discloses a process for producing unsaturated and saturated free fatty acid from trap oils, trap greases, brown greases and grease trap waste as starting material. The process consist in subjecting the starting material to a pretreatment, a first purification step, a fractional step, a second purification step and eventually a hydrogenation step. Methyl esters of unsaturated and saturated free fatty acids, oleic acid and stearin is obtained from this process.

Although each of these processes renders somewhat of a solution, at least partially, a common shortcoming for all is the fact that most of the fats, oils, and grease found in the grease trap goes to landfills or is biodegraded without further benefits or tangible results.

Bioremediation in any of its forms (aerobic or anaerobic) is a slow process. It requires significant equipment investment and demands open areas for proper handling of the aerobic processes. Biogas production would be, perhaps, one of the few by-products that can offset some of the costs associated with the actual process of grease trap waste treatment. All bioremediation alternatives require controlled conditions for proper development and results.

Controlled processes are often expensive and hard to replicate. Furthermore, bioremediation activity tends to be very dependent on climatic and ambient conditions.

Burning dewatered grease cake may facilitate EPA compliance when disposing of these residues, but adds no value to the process and, in fact, increases the costs of grease trap waste treatment associated with the handling, transportation, and burning of these solids from the dewatered grease trap refuse. This alternative is not available to most cities and municipalities because many lack incinerator facilities.

Discharging grease trap refuse at the entrance of wastewater treatment facilities may facilitate avoiding clogging due to the water flow and pipes' diameters, but it certainly affects the operational costs of the wastewater treatment facility as a result of having more solids and organics to be dealt with at this stage. With this method, no benefits are obtained from the grease trap waste.

Several brands and types of biological grease digesters could be added to grease traps to reduce the amount of grease that accumulates in it. Many of these are hybrid bacteria designed to convert the grease to less problematic waste like carbon dioxide and water. Many advertise reduction of noxious odors. However, some drain cleaners and bacterial agents may only soften the grease and transfer the problem further downstream, even when used properly.

While some of these solutions may serve the purpose of dealing with the disposal of grease trap waste, none of them provides an easy to implement, simple alternative for effectively handling grease trap waste and recuperating (recycle) FOG material found in it.

It is therefore an object of the invention to process grease trap waste or refuse to remove all organic matter to facilitate its disposal in accordance with the Environmental Protection Agency (EPA) established standards, and reclaim all fats, oils, and grease found in it.

It is another object of the invention to remove all fats, oils, and grease found in grease trap dewatered sludge by employing a dissolving procedure. The procedure is based on either organic or inorganic solvents (hydrocarbons or organic products with lipid-dissolving properties), which can be flammable or non-flammable.

It is another object of the invention to separate and remove all organic matter found in the grease trap waste to facilitate its disposal in accordance with EPA regulations.

It is another object of the invention to process grease trap dewatered refuse encompassing the physical separation of the dissolved fats, oils, and grease, and other compounds in the solvent from the inert solids.

It is another object of the invention to process grease trap dewatered refuse to obtain, after the separation stage, a solid that is free from organic materials that can be disposed of in accordance with EPA guidelines and regulations.

It is another object of the invention to process grease trap dewatered refuse and recuperate the solvent used at the separation stage, delivering the recycled solvent back to a pre-mixing tank for its continued use.

It is another object of the invention to process grease trap refuse and separate all fats, oils, and grease found in it, to obtain a homogenous grease or oil, free from inert materials, water and solids, suitable for other oleo-chemical processes and applications.

SUMMARY OF THE INVENTION

In accordance with the present invention, there is provided a method to process grease trap waste or refuse by removing all organic materials, including fats, oils, and grease (FOG), rendering the resulting material free from organic matter, providing a solution for proper handling and disposal of grease trap waste by eliminating most environmental concerns and simplifying disposal conditions, while recuperating (recycling) FOG found in the grease trap waste.

Collected grease trap refuse is dewatered to increase its concentration with the help of coagulant agents. The resulting sludge is then mixed with a solvent, and the dissolved fractions of solids, fats, oils, grease, and water are separated by mechanical methods. The solids are washed for further removal of any traces of fats, oils, and grease, rendering them substantially free from organic mater. The solids are then transferred to a dryer where remaining water content and organic matter residue is dried. The resulting solids, free from organics, and dried, are ready for disposal meeting established Environmental Protection Agency (EPA) guidelines. The solvent is separated from the fats, oils, and grease fractions, leaving clean and homogenous grease substantially free of water and inorganic material. The solvent is then reclaimed and re-used repeatedly in the same process. The grease, clean and homogenous, can be used in many oleo-chemical processes and applications.

BRIEF DESCRIPTION OF THE DRAWING

A complete understanding of the present invention may be obtained by reference to the accompanying drawing, when considered in conjunction with the subsequent, detailed description, in which.

DESCRIPTION OF THE PREFERRED EMBODIMENT

Figure 1:
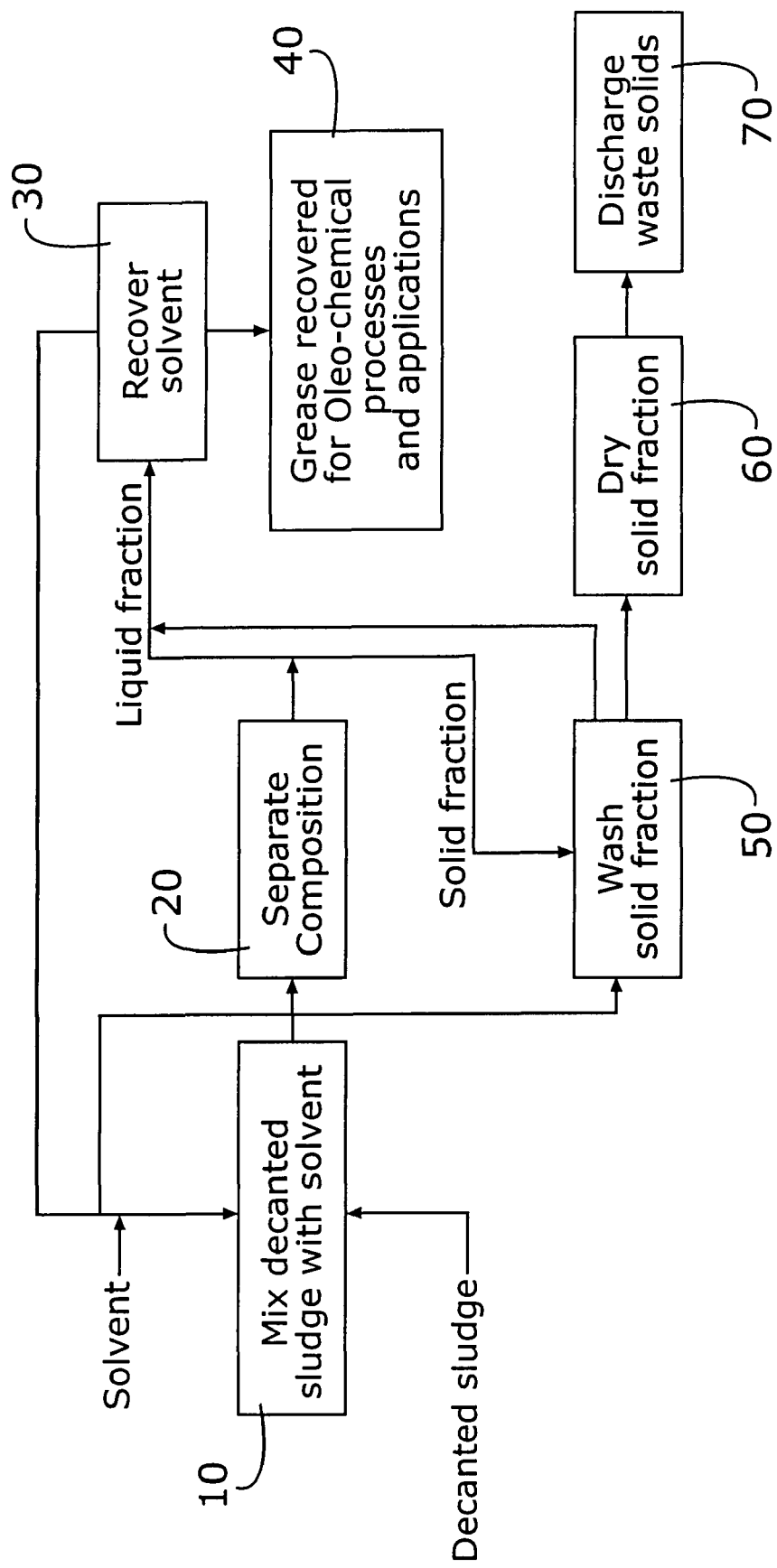
FIG. 1 is a flow chart for the removal of organic matter and the recovery of fats, oils, and grease from grease trap waste sludge, in accordance with the present invention.

The present invention features a process for removal of organic matter and the recovery of fats, oils, and grease from grease trap waste sludge.

Referring to FIG. 1, decanted sludge and solvent are mixed, step 10. The percentage (%) of decanted sludge in the solvent ranges from 10 to 90% (w/w), but is limited to 60 to 90% of the sludge weight. The remaining percentage is composed of the solvent. The solvent may be organic or inorganic, and flammable or non-flammable. Several such solvents can be used in this process including, but not limited to: aliphatic and aromatic solvents and their derivatives; organic acid esters and their derivatives; hydrocarbon petroleum derivatives; saturated and non-saturated hydrocarbons and derivatives thereof, glycerides, ethers, ketones, cyclic hydrocarbons, heterocyclic hydrocarbons, and derivatives thereof, and any other product with good dissolving properties with the raw material.

The decanted sludge dissolves easily in the indicated solvents. It is possible to dissolve at temperatures in the range of 5 to 45° C. (41 to 113° F.) under moderate agitation to facilitate the mixing of the decanted sludge and solvent. Dissolving takes place quickly and without particular care. The decanted sludge and solvent are fed by flux control of both streams or by any other alternative method, which is known to one of ordinary skill in the art.

Flux control refers to any method used for the addition of an ingredient or the application of an agent in a measured dose. In this case, combination of manual, mechanical, electrical, or hydraulic devices that facilitate the correct mixing of components can be used. These devices include, but are not limited to: conveyors, fluid pumps, and electromechanical flow control valves.

The sludge and solvent composition is then separated into liquid and solid fractions by a mechanical process, step 20, well known in the art of wastewater material handling.

The liquid fraction is then introduced to a solvent recovery process, step 30. This process pertains to any and all existing methods and processes available for solvents recovery and recycling. These methods include, but are not limited to: evaporation, condensation, and membrane separation.

Grease is then recovered, step 40, the resultant material then being available for oleo-chemical processes and applications.

The solid fraction that is generated from separating, step 20, is then washed, step 50, with the aid of solvent, and dried, step 60. Liquid from the solid fraction washing process, step 50, is directed to the solvent recovery process, step 30. The solvent recovered is provided to the sludge/solvent mixing process, step 10. Waste solids are then discharged, step 70.

Since other modifications and changes varied to fit particular operating requirements and environments will be apparent to those skilled in the art, the invention is not considered limited to the example chosen for purposes of this disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for treating fats, oils, and grease (FOG), and for recovering components thereof, the steps comprising:
   a) providing a decanted grease trap waste sludge;
   b) providing a solvent;
   c) mixing said decanted grease trap waste sludge with said solvent to create a mixture thereof comprising fats, oils, and grease;
   d) separating said mixture into a liquid fraction comprising grease and a solid fraction; and
   e) introducing at least a portion of said liquid fraction into said solvent.

2. The method in accordance with claim 1, wherein, in said mixing step (c), the amount of decanted sludge ranges from 10 to 90% of the resulting mixture.

3. The method in accordance with claim 1, wherein said mixture separating step (d) comprises physically separating said mixture.

4. The method in accordance with claim 1, the steps further comprising:
   f) washing said solid fraction.

5. The method in accordance with claim 4, the steps further comprising:

g) drying said solid fraction.

6. The method in accordance with claim 4, wherein said solid fraction is washed with said solvent.

7. The method in accordance with claim 4, wherein said introducing at least a portion of said liquid fraction step (e) comprises recovering solvent from said liquid fraction derived from said separating step (d) and said washing step (f).

8. The method in accordance with claim 5, the steps further comprising:

h) discharging said dried solid fraction.

9. A method for treating fats, oils, and grease (FOG) and for recovering components thereof, the steps comprising:

a) mixing a decanted grease trap waste sludge with a solvent to create a mixture thereof comprising fat, oil, and grease;

b) separating said mixture into a liquid fraction comprising grease and a solid fraction;

c) recovering at least a portion of said solvent mixed with said sludge comprising fats, oils, and grease; and d) introducing said portion of said solvent at said mixing step (a).

10. The method in accordance with claim 9, wherein said mixture separating step (b) comprises physically separating said mixture.

11. The method in accordance with claim 9, the steps further comprising:

e) washing said solid fraction.

* * * * *